United States Patent Office 3,338,331
Patented Aug. 29, 1967

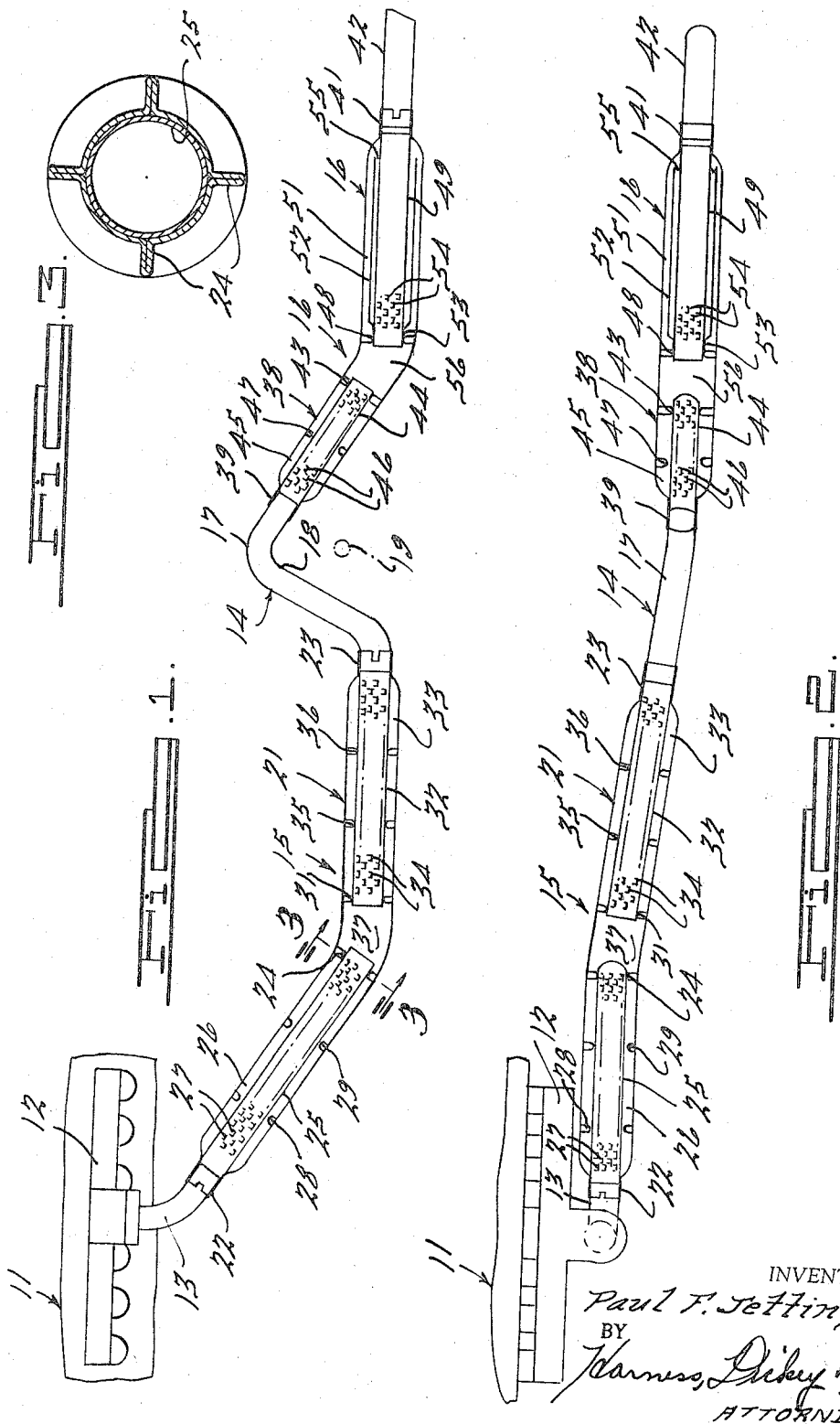

3,338,331
EXHAUST SYSTEM WITH PLURAL SILENCING UNITS
Paul F. Jettinghoff, Jackson, Mich., assignor to Walker Manufacturing Company, a corporation of Delaware
Filed Mar. 5, 1965, Ser. No. 437,444
2 Claims. (Cl. 181—35)

ABSTRACT OF THE DISCLOSURE

An exhaust system for an automobile that consists of a first straight through silencer for removing high frequency noises and roughness and a second straight through silencer in series with the first which removes high frequency noises and is tuned to attenuate the fifth mode of vibration of the exhaust sound.

---

This invention relates to exhaust systems for internal combustion engines and more particularly to exhaust systems for automotive vehicles.

It is an object of this invention to provide a multi part exhaust system containing a multiplicity of silencing components that are designed and arranged so as to silence effectively the whole spectrum of exhaust gas sounds emanating from an internal combustion engine.

It is another object of this invention to provide an exhaust system that is small in diameter and, therefore, takes a minimum of space beneath the body of an automotive vehicle.

A further object of the invention is to provide an exhaust system that has a minimum back pressure and in which the silencing components are distributed over the entire length of the system.

The invention accomplishes the foregoing and other objects by means of an elongated exhaust system having an inlet end and an outlet end between which are placed two silencing units. One of the silencing units comprises an outer pipe having an inlet bushing and an outlet bushing formed at its opposite ends. A first reduced diameter portion is provided adjacent to the inlet bushing and a first inner pipe is supported between the inlet bushing and the first reduced diameter portion. The first inner pipe has a plurality of longitudinally spaced perforations whereby the silencing chamber that is provided between the first inner pipe and the portion of the outer pipe between the inlet bushing and the first reduced diameter portion functions as a spit chamber. The outer pipe has a second reduced diameter portion adjacent to the outlet bushing and a second inner pipe extends between the second reduced diameter portion and the outlet bushing. An intermediate pipe is affixed at one of its ends to the second inner pipe and is open at its outer end to provide a tuning neck between the second inner pipe and the silencing chamber provided between the second inner pipe and the portion of the outer pipe between the outlet bushing and its second reduced diameter portion. The second of the silencing units also comprises an outer pipe having an inlet bushing formed at one end thereof and an outlet bushing formed at the other end thereof. First and second inner pipes are supported between first and second reduced diameter portions of the outer pipe and the inlet and outlet bushings, respectively. Each of the inner pipes is perforated so that the space between it and the adjacent portion of the outer pipe functions as a spit chamber.

A preferred embodiment of the invention is illustrated in the accompanying drawings, in which:

FIGURE 1 is a schematic side elevational view of an exhaust system for the internal combustion engine of an automotive vehicle embodying this invention;

FIGURE 2 is a top plan view of the exhaust system shown in FIGURE 1; and

FIGURE 3 is a cross sectional view taken along the line 3—3 of FIGURE 1.

Referring now to the drawings, an automotive internal combustion engine is shown schematically and identified by the reference numeral 11. The engine 11 has an exhaust manifold 12 that is connected by an exhaust inlet pipe 13 to an exhaust system embodying this invention, indicated generally by the reference numeral 14. The exhaust system 14 comprises a first silencing unit 15 and a second silencing unit 16 that are interconnected by a pipe 17 having a kickup 18 to clear a rear axle 19 of the vehicle.

The first silencing unit 15 comprises an outer pipe 21 that terminates at one end in a reduced diameter inlet bushing 22 that is interconnected to the outlet end of the exhaust inlet pipe 13. The other end of the outer pipe 21 terminates in a reduced diameter outlet bushing 23 that is connected to the inlet end of the pipe 17. The outer pipe 21 has a first reduced diameter portion 24 that is formed by a plurality of pinched down sections as shown in FIGURE 3. The inner diameter of the reduced diameter portion 24 engages the outlet end of a first inner pipe 25. The inlet end of the inner pipe 25 is engaged and supported by the inlet bushing 22 so that the inner pipe 25 is fixed relative to the outer pipe 21. A first silencing chamber 26 thus is formed between the inner pipe 25 and the portion of the outer pipe 21 between the inlet bushing 22 and the first reduced diameter portion 24. A plurality of perforations or louvers 27 are formed along the length of the inner pipe 25 to permit gas to flow into the silencing chamber 26 whereby the chamber 26 functions as a spit chamber for absorbing the energy of high frequency sound waves emanating from the engine 11.

The silencing chamber 26 is divided into a plurality of longitudinally spaced units by pinched down sections 28 and 29 of the outer pipe 21. The inner diameter of the pinched down sections 28 and 29 is greater than the outer diameter of the inner pipe 25 so that a restricted flow passage is provided between adjacent units.

The outer pipe 21 has another pinched down portion 31 formed between the pinched down portion 24 and the outlet bushing 23 and adjacent to the latter. The pinched down portion 31 has a reduced diameter that engages the outer periphery of a second inner pipe 32. The outlet end of the second inner pipe 32 is supported by the outlet bushing 23 of the outer pipe 21. A second silencing chamber 33, therefore, is provided between the outer diameter of the inner pipe 32 and the portion of the outer pipe 21 between the pinched down portion 31 and the outlet bushing 23. A plurality of louvers 34 are formed along the length of the second inner pipe 32 to permit gas to flow to the chamber 33 whereby the chamber functions as a spit chamber for absorbing high frequency sounds emanating from the engine 11. The chamber 33 is divided into a plurality of spaced units by pinched down sections 35 and 36 formed in the outer pipe 21. The pinched down sections 35 and 36 have an inner diameter that engages the outer periphery of the inner tube 32 so that the units will each function as separate spit chambers.

It should be readily apparent that the first silencing unit 15 is a straight through unit since gas may flow directly from the inlet bushing 22 through the first inner pipe 25 to an open chamber 37 formed by the outer pipe 21 between the pinched down portions 24 and 31. Gas inflows from the open chamber 37 through the second inner pipe 32 to the outlet bushing 23. The portion of the outer pipe 21 that forms the chamber 37 may be bent, as seen in FIGURE 2 so that the silencing unit 15 may be supported by an adjacent member of the vehicle frame (not shown).

The second silencing unit 16 also comprises an outer pipe 38 that is formed with a reduced diameter inlet bushing 39 at one end which is connected to the outlet end of the pipe 17. A reduced diameter outlet bushing 41 formed at the other end of the outer pipe 37 is connected to an exhaust outlet pipe 42 which is of sufficient length to carry the exhaust gas past the rear bumper (not shown) of the vehicle.

The outer pipe 38 has a first reduced diameter pinched down portion 43 that engages the outlet end of a first inner pipe 44. The inlet end of the inner pipe 44 is engaged and supported by the inlet bushing 39. A first silencing chamber 45 thus is provided between the outer portion of the inner pipe 44 and the portion of the outer pipe 38 between the inlet bushing 39 and the reduced diameter portion 43. The inner pipe 44 is provided with a plurality of longitudinally spaced perforations or louvers 46 so that gas may flow from the inner pipe 44 to the chamber 45 whereby the chamber 45 functions as a spit chamber for absorbing the energy of high frequency sound waves that emanate from the engine 11. The silencing chamber 45 may be divided into two longitudinally spaced units by a pinched down portion 47 of the outer pipe 38 having a reduced diameter that is greater than the outer diameter of the inner pipe 44, for providing a restricted flow passage between the adjacent units.

The outer pipe 38 has a third reduced diameter portion 48 that is formed between the reduced diameter portion 43 and the outlet bushing 41 and adjacent to the latter. The reduced diameter portion 48 engages the inlet end of a second inner pipe 49, the outlet end of which is supported by the exhaust outlet bushing 41. A second silencing chamber 51, therefore, is provided between the outer diameter of the second inner pipe 49 and the portion of the outer pipe 38 between the third reduced diameter portion 48 and the outlet bushing 41. An intermediate pipe 52 has a reduced diameter portion 53 that engages the inner tube 49 completely around its periphery and is affixed to it adjacent to its inlet end. A plurality of perforations or louvers 54 are formed in the inner pipe 49 along a small portion of its length adjacent to the reduced diameter portion 53 of the intermediate pipe 52. The opposite end of the intermediate pipe 52 is open around its periphery, as at 55, so that the space between the inner pipe 49 and the intermediate pipe 52 forms as a tuning neck for the silencing chamber 51 so that the chamber 51 acts as a Helmholtz tuner. Preferably, this tuner is designed to eliminate the fifth mode of sound vibrations of the exhaust system and this unit is located as close to the anti-node of the fifth mode of vibration as possible.

The second silencing unit 16 is also a straight through unit since gases may flow from the inlet bushing 39 through the first inner pipe 44 into a chamber 56 that is formed by the outer tube 38 between the reduced diameter portions 47 and 48. The portion of the outer pipe 38 that defines the chamber 56 may be bent so that the outlet end of the silencing unit 16 again extends to the horizontal after the kickup 18. From the chamber 56 gas may flow straight through the second inner pipe 49 out of the outlet bushing 41.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An exhaust system for an internal combustion engine comprising an elongated exhaust pipe having an inlet end and an outlet end, first and second silencing units positioned along the length of said exhaust pipe, said first silencing unit comprising an outer pipe, a reduced diameter inlet bushing means formed at one end of said outer pipe and reduced diameter outlet bushing means formed at the other end of said outer pipe, said outer pipe having a first reduced diameter portion formed adjacent to said inlet bushing means, a first inner pipe extending from said inlet bushing means to said first reduced diameter portion and supported thereby for defining a first silencing chamber between said first inner pipe and the portion of the outer pipe between said first inner pipe and the portion of the outer pipe between said inlet bushing the portion of the outer pipe between said inlet bushing means and said first reduced diameter portion, a second reduced diameter portion formed in said outer pipe adjacent to said outlet bushing means, a second inner pipe extending between said outlet bushing means and said second reduced diameter portion and supported thereby for defining a second silencing chamber between said second inner pipe and the portion of said outer pipe between said second reduced diameter portion and said outlet bushing means, a plurality of longitudinally spaced openings in said first inner pipe whereby said first silencing chamber functions as a spit chamber and a plurality of perforations in said second inner pipe whereby said second silencing chamber functions as a spit chamber, said second silencing unit comprising an elongated tubular outer pipe, a reduced diameter inlet bushing at one end of said outer pipe and a reduced diameter outlet bushing at the other end of said outer pipe, a reduced diameter portion formed in said outer pipe adjacent one of said bushings, a first inner pipe extending from one of said bushings to said reduced diameter portion and supported thereby to define a first annular silencing chamber between said first inner pipe and said outer pipe between said one of said bushings and said reduced diameter portion, said first inner pipe having a plurality of longitudinally spaced perforations formed therein whereby said first chamber functions as a spit chamber, a second reduced diameter portion formed in said outer pipe adjacent the other of said bushings, a second inner pipe supported at one end by said second reduced diameter portion and at the other end by said other bushing and defining a second silencing chamber between said second inner pipe and the portion of said outer pipe between said second reduced diameter portion and said other bushing, an intermediate pipe affixed at one of its ends around its periphery to said second inner pipe adjacent one of its ends and open at the other end thereof to said second silencing chamber and a plurality of perforations formed in said second inner pipe adjacent said one end of said intermediate pipe whereby the space between said second inner pipe and said intermediate pipe functions as a tuning neck in conjunction with said second silencing chamber, said second silencing chamber of said second silencing unit being tuned to eliminate the fifth mode of vibrations of the exhaust system and being positioned contiguous to an anti-node of said fifth mode of vibration.

2. A silencing system as set forth in claim 1 wherein the first silencing unit includes a plurality of reduced diameter portions formed in the outer pipe between each of the reduced diameter portions for dividing the silencing chambers into a plurality of spaced units, a first group of the plurality of reduced diameter portions in the outer pipe are spaced radially outwardly of the adjacent inner pipe to provide a restricted flow path between the adjacent units, the remaining of said plurality of reduced diameter portions engaging the other of said inner pipes for dividing the silencing chamber defined thereby into separate units each of which functions as a spit chamber, and the outer pipe of the second silencing unit has a third reduced diameter portion positioned between the first reduced diameter portion and the one of the bushings, said third reduced diameter portion having a greater internal diameter than the external diameter of the first inner pipe for dividing the first silencing chamber into two chambers having a restricted flow path therebetween.

References Cited

UNITED STATES PATENTS

| | | | |
|---|---|---|---|
| 1,878,424 | 9/1932 | Oldberg | 181—35 |
| 2,065,232 | 12/1936 | MacKenzie et al. | 181—48 |
| 2,099,887 | 11/1937 | Heath | 181—36 |
| 2,297,046 | 9/1942 | Bourne | 181—35 |
| 2,367,753 | 1/1945 | Buck | 181—35 |
| 3,036,654 | 1/1962 | Powers | 181—35 |
| 3,104,734 | 9/1963 | Ludlow et al. | 181—48 |
| 3,219,142 | 11/1965 | Deremer | 181—61 X |
| 3,263,772 | 8/1966 | Irwin et al. | 181—59 |

FOREIGN PATENTS

| | | |
|---|---|---|
| 1,351,921 | 12/1963 | France. |
| 892,780 | 3/1962 | Great Britain. |

RICHARD B. WILKINSON, *Primary Examiner.*

R. S. WARD, JR., *Assistant Examiner.*